(12) United States Patent
Shaeff

(10) Patent No.: US 11,453,430 B2
(45) Date of Patent: Sep. 27, 2022

(54) HEATED VEHICLE STEERING WHEEL HAVING THERMAL CONDUCTION

(71) Applicant: Ford Global Technologies, LLC, Dearborn, MI (US)

(72) Inventor: Nathan Shaeff, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 16/689,235

(22) Filed: Nov. 20, 2019

(65) Prior Publication Data

US 2021/0146986 A1   May 20, 2021

(51) Int. Cl.
*B62D 1/06* (2006.01)
*H05B 1/02* (2006.01)

(52) U.S. Cl.
CPC ............ *B62D 1/06* (2013.01); *H05B 1/0236* (2013.01)

(58) Field of Classification Search
CPC ......... B62D 1/06; B62D 1/065; H05B 1/0236
See application file for complete search history.

(56) References Cited

U.S. PATENT DOCUMENTS

| 6,392,195 | B1 | 5/2002 | Zhao et al. |
| 6,815,642 | B2 | 11/2004 | Haag et al. |
| 7,019,261 | B2 | 3/2006 | Worrell et al. |
| 2004/0079431 | A1* | 4/2004 | Kissell ............... F16L 59/021 138/167 |
| 2015/0344061 | A1* | 12/2015 | Uematsu ............... H05B 3/54 264/272.11 |
| 2016/0327979 | A1* | 11/2016 | Lettow ............... H05B 3/145 |
| 2017/0355391 | A1 | 12/2017 | Wittkowski et al. |

FOREIGN PATENT DOCUMENTS

WO   02094634  A1   11/2002

* cited by examiner

*Primary Examiner* — Dana Ross
*Assistant Examiner* — Joe E Mills, Jr.
(74) *Attorney, Agent, or Firm* — Vichit Chea; Price Heneveld LLP

(57) ABSTRACT

A vehicle steering wheel is provided that includes a core structure, a heater mat surrounding a portion of the core structure to define a heated portion, a gap in the heater mat defining an unheated portion, a cover wrap surrounding the heater mat and having first and second edges stitched together at a seam, and a thermally conductive polymer thermally coupled to the heater mat and extending across the gap below the first and second edges of the cover wrap for conducting thermal energy.

17 Claims, 2 Drawing Sheets

HEATED VEHICLE STEERING WHEEL HAVING THERMAL CONDUCTION

FIELD OF THE INVENTION

The present invention generally relates to vehicle steering wheels, and more particularly relates to heated steering wheels.

BACKGROUND OF THE INVENTION

Motor vehicles are commonly equipped with a steering wheel that may be heated with an electric heater. The heater, typically in the form of a heater mat, extends over a portion of the steering wheel and typically does not extend over other portions of the steering wheel, such as the area where an outer cover wrap, e.g., leather cover, is sewn together. As a result, the steering wheel has non-heated portions which results in non-uniform heating. It would be desirable to provide for a more uniform heating of the steering wheel.

SUMMARY OF THE INVENTION

According to a first aspect of the present invention, a vehicle steering wheel is provided. The vehicle steering wheel includes a core structure, a heater surrounding at least a portion of the core structure to define a heated portion, a gap in the heater defining an unheated portion, a cover wrap surrounding the heater and having first and second edges joined together at a seam above the gap, and a thermally conductive polymer thermally coupled to the heater and extending across the gap below the first and second edges of the cover wrap for conducting thermal energy across the gap.

Embodiments of the first aspect of the invention can include any one or a combination of the following features:
  the first and second edges are stitched together at a stitch seam;
  the cover wrap comprises one of leather and vinyl;
  the gap extends below the first and second edges of the cover wrap and the conductive polymer extends over the gap;
  the thermally conductive polymer comprises a liquid curable polymer applied onto at least the first and second edges of the heater;
  the thermally conductive polymer comprises polyacetylene;
  the thermally conductive polymer a thermally conductive polymer tape;
  the heater comprises an electric heater mat;
  the heater mat has first and second edges, wherein the gap is defined between the first and second edges of the heater mat;
  the core structure comprises a rigid core and a surrounding compliant layer; and
  the cover wrap comprises a first cover wrap material overlapping at a tuck with a second cover wrap material, and wherein the conductive polymer further extends under the overlapping portions of the tuck.

According to a second aspect of the present invention, a vehicle steering wheel is provided. The vehicle steering wheel includes a core structure, an electric heater mat surrounding a portion of the core structure to define a heated portion, a gap in the electric heater mat defining an unheated portion, a cover wrap surrounding the electric heater mat and having first and second edges stitched together at a seam, and a thermally conductive polymer thermally coupled to the electric heater mat and extending across the gap below the first and second edges of the cover wrap for conducting thermal energy.

Embodiments of the second aspect of the invention can include any one or a combination of the following features:
  the cover wrap comprises one of leather and vinyl;
  the gap extends below the first and second edges of the electric heater mat and the conductive polymer extends over or through the gap;
  the thermally conductive polymer comprises a liquid curable polymer applied onto at least the first and second edges of the electric heater mat;
  the thermally conductive polymer comprises polyacetylene;
  the thermally conductive polymer comprises a thermally conductive polymer tape;
  the core structure comprises a rigid core and a surrounding polyurethane layer;
  the cover wrap comprises a first cover wrap material overlapping at a tuck with a second cover material, and wherein the conductive polymer further extends under the overlapping portions; and
  the heater mat has first and second edges, wherein the gap is defined between the first and second edges of the heater mat.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
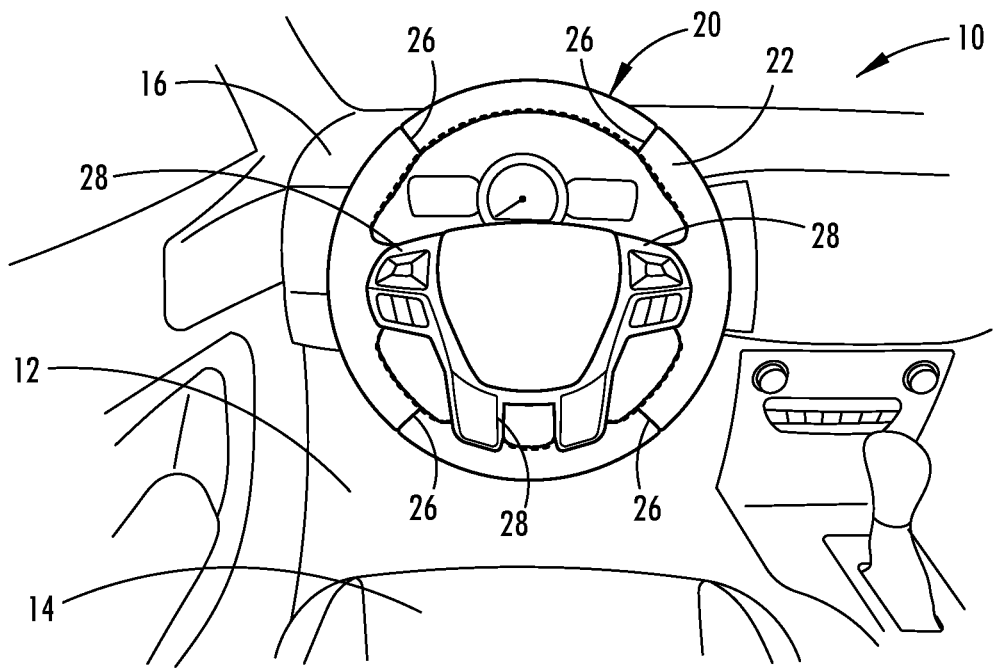
FIG. 1 is a front perspective view of the interior of an automotive vehicle having a heated steering wheel.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a restraint monitoring system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, a heated steering wheel 20 is generally illustrated located in a motor vehicle 10. The heated steering wheel 20 includes a core structure and a heater surrounding a portion of the core structure to define a heated portion so as to heat the steering wheel 20 when desired. The steering wheel 20 also includes a gap in the heater defining an unheated portion and a cover wrap surrounding the heater and having first and second edges joined together at a seam above the gap. The steering wheel 20 further includes a conductive polymer thermally coupled to the heater and extending across the gap below the first and second edges of the cover wrap for conducting thermal energy across the gap.

Referring to FIG. 1, the motor vehicle 10 is generally illustrated having the heated steering wheel 20, according to one embodiment. The vehicle 10 may be a wheeled motor vehicle having a steering wheel 20 for steering the direction of the steerable wheels, such as for a car, a truck, a van, a bus, a sport utility vehicle (SUV) or for steering other steerable vehicles having a steering wheel such as a boat. The vehicle 10 is shown having a body defining a passenger compartment 12 having one or more seats 14 configured to seat one or more passengers. The steering wheel 20 is shown positioned in front of a driver's seat 14 to enable the seated driver to engage and operate the steering wheel 20 with his or her hands to rotate the steering wheel 20 in clockwise and counter clockwise directions. The steering wheel 20 is generally shown extending vehicle rearward from the dashboard 16 as is common in driver steered vehicles.

Figure 2:
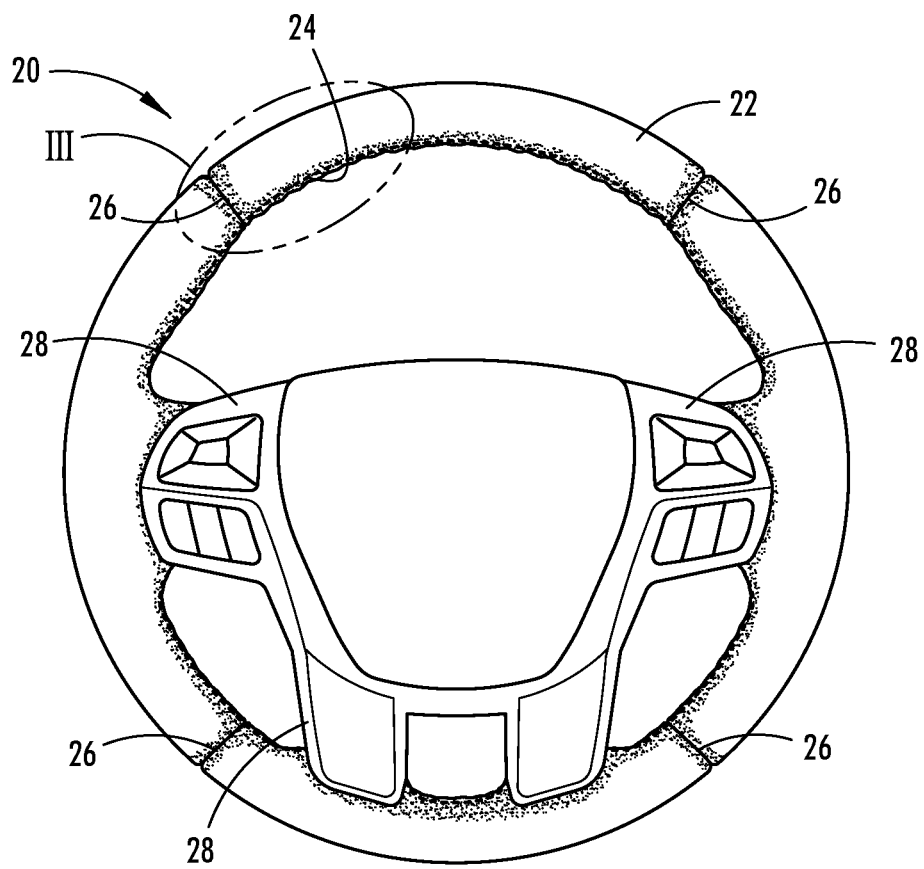
FIG. 2 is an enlarged view of the heated steering wheel which is equipped with a heater mat and a thermally conductive polymer, according to one embodiment.

The steering wheel 20 is further illustrated in FIG. 2 showing the outer cover wrap 22 wrapped around various layers of the steering wheel rim which is a ring-shaped portion of the steering wheel 20. The cover wrap 22 has first and second edges 22A and 22B proximate one another when wrapped around the core structure and stitched together along a stitch seam 24. Multiple pieces of material for the cover wrap 22 may be used on a single steering wheel and may be placed so as to overlap at tuck portions 26 where overlapping portions of the cover wrap 22 are joined or connected together such as via stitching or adhesive. The cover wrap 22 may include leather, according to one example, or vinyl according to another example. The cover wrap 22 may be assembled onto the steering wheel 20 as a sheet of cover material that has first and second edges 22A and 22B on opposite sides, wherein the sheet of material wraps around the generally circular cross-sectional portion of the core structure of the steering wheel 20 and the first and second edges 22A and 22B are pulled together and stitched together via stitching to form the stitch seam 24.

The steering wheel 20 further may include other structures such as spokes 28 that are shown extending inward from the ring-shaped portion for providing stability to the steering wheel. Various components may be assembled onto the spokes 28 including an operator actuatable horn input, and other inputs such as radio inputs, HVAC inputs, speed control inputs, and other controls, as well as one or more airbags.

Figure 3:
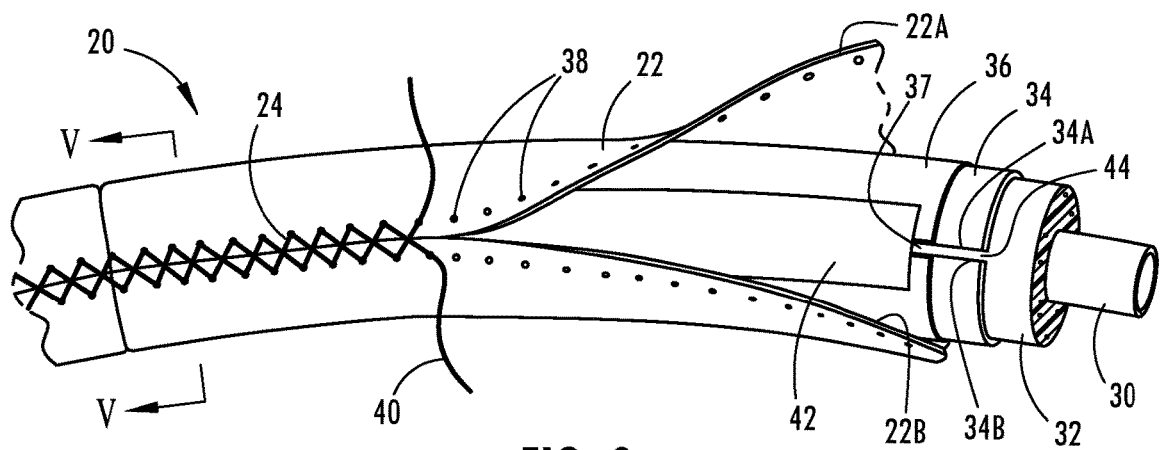
FIG. 3 is an enlarged view of section III of FIG. 2 showing various layers of the steering wheel in a partial assembled view.

Referring to FIG. 3, a portion of the ring-shaped rim portion of the steering wheel 20 is generally illustrated partially assembled so as to illustrate the various layers of the steering wheel 20. The steering wheel 22 includes a rigid core 30 which is shown in a generally cylindrical shape which may be made of magnesium or aluminum, according to some examples. The core 30 may also be referred to as an armature for providing structural support and shape to the steering wheel 20. Surrounding the core 30 is compliant layer 32 that may be made of polyurethane or foam. The compliant layer 32 may have a generally cylindrical shape and provides compressibility with memory that allows for a soft or cushioned feel to the steering wheel 20. The compliant layer 32 and core 30 together provide a core structure of the steering wheel 20.

The steering wheel 20 includes a heater shown in the form of an electric powered heater mat 34 according to one embodiment. The heater mat 34 surrounds at least a portion of the core structure made up of compliant layer 32 and core 30. The heater mat 34 extends around a substantial portion of the core structure to define heated portions of the steering wheel 20 when the heater is activated. The heater mat 34 does not fully extending around the core structure but instead is positioned with first and second edges 34A and 34B on opposite sides separated from one another so as to create a gap 44 between the region of the stitch seam 24. This advantageously allows for the cover wrap 22 to be stitched together along the stitch seam 24 without puncturing or otherwise damaging the heater mat 34 during assembly. As such, the portions of the core structure that are not covered by the heater mat 34 are defined as unheated portions of the steering wheel 20.

An optional fabric backer 36 may extend around the heater mat 34 so as to provide a backing for the cover wrap 22 and dielectrically isolate the heater mat 34. The fabric backer 36 may include a thin electrically dielectric sheet of material, such as fleece or polyester that covers the heating element on the heater mat 34 and allows heat to pass therethrough to the cover wrap 22. The fabric backer 36 is shown having a gap 37 above gap 44 in the heater mat 34. The fabric backer 36 may have a thickness in the range of 0.25-1.0 millimeters, according to one embodiment. The steering wheel 20 may be configured absent the fabric backer 36, according to other embodiments.

A conductive polymer 42 is applied onto the fabric backer 36 in a region that extends across the gap 44. The conductive polymer 42 extends across the gap 44 and is thermally coupled to the heater mat 34 and the first and second edges 22A and 22B of the cover wrap 22. As such, heat generated by the heater mat 34 thermally conducts heat to the conductive polymer 42 and to the cover wrap 22 in the region of the stitch seam 24 so as to conduct heat (thermal energy) across the unheated portion of the steering wheel 20. As a result, a greater portion(s) of the steering wheel 20 is more uniformly heated.

The cover wrap 22 may be applied over the core structure mode of the compliant layer 32 and core 30, fabric backer 36 and conductive polymer 42 by applying a sheet of cover wrap material having first and second edges 22A and 22B wrapped around the core structure to define a substantially covered cover wrap 22. The first and second edges 22A and 22B of the cover wrap 22 may abut one another and are joined together along the stitch seam 24. The stitch seam 24 includes stitching 40 extending through holes 28 in the cover wrap material to pull the first and second edges 22A and 22B of the cover wrap 22 toward one another and thereby joined together. The stitching 40 may be applied with a stitching or sewing needle that extends through the holes 38 and pulls the stitching tight to define the stitch seam 24, according to one example. The stitching may include a first stitching applied proximate the first edge 22A, a second stitch applied proximate the second edge 22B and a third stitch stitching the first stitching to the second stitching, according to another example.

The cover wrap 22 may include one or more pieces of leather, according to one embodiment. According to another embodiment, the cover wrap 22 may include one or more pieces of a vinyl. The cover wrap 22 provides a surface upon which a driver may contact and grip the rim of the steering wheel 20 with his or her hands. In doing so, the heater mat 34 and conductive polymer 42 advantageously substantially uniformly heat the steering wheel 20 to an elevated temperature when the heater mat 24 is activated. The heater mat 24 may be actuated in response to a user input or may be automatically controlled based on temperature or other criteria.

Figure 4:
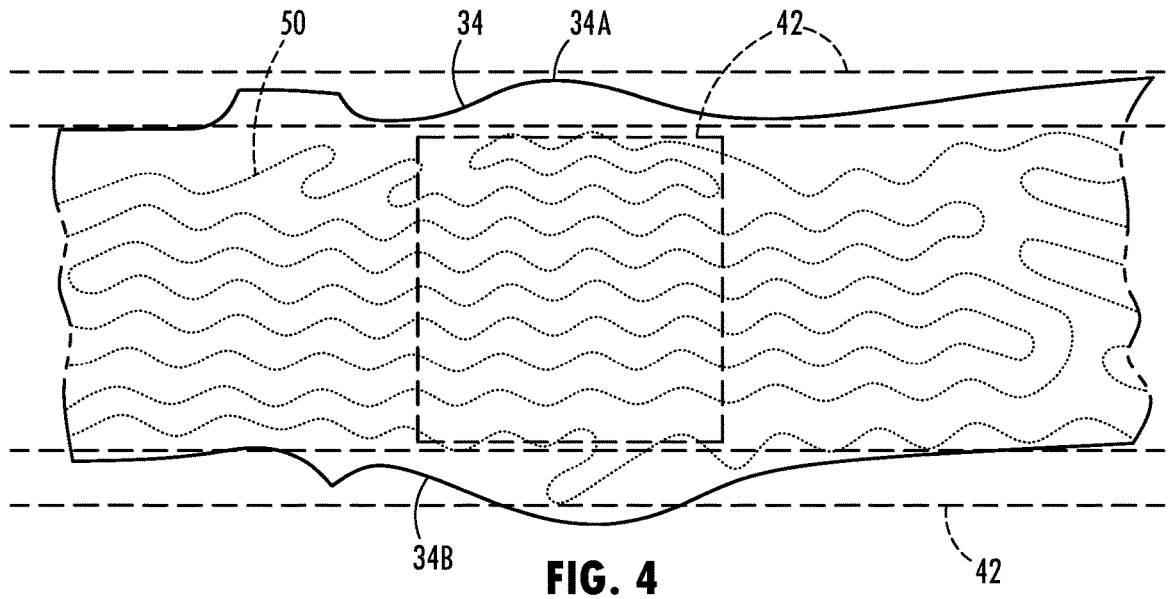
FIG. 4 is a front view of the heater mat and the thermally conductive polymer applied thereto, according to one embodiment.
Figure 5:
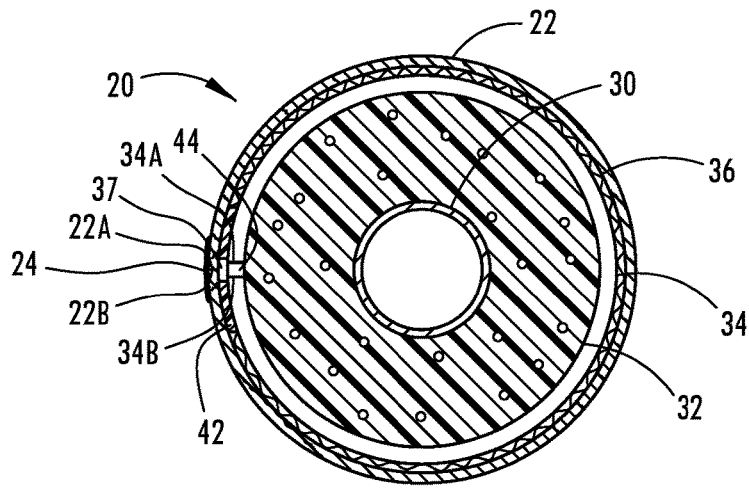
FIG. 5 is a cross-sectional view taken through line V-V of FIG. 2 further illustrating various layers of the heated steering wheel.

Referring to FIG. 4, the heater mat 34 is shown having the conductive polymer 42 applied thereto. The heater mat 34 may include electrical heating elements 50 or circuitry extending throughout one or more surfaces of the heater mat 34 to generate heat when electrical current is applied thereto. A voltage available from an electric power supply, such as from a car battery, may be applied to the heater mat 34 to generate heat (thermal energy), with electric heating elements 50 to heat the heater mat 34 substantially uniformly. The heater elements 50 may include electrical resistance elements that generate heat when a voltage is applied thereto. Examples of electrical heating elements 50 may include negative temperature coefficient (NTC) heater elements. The heater mat 34 may include a rectangular shape or other shapes that cover a heated portion of the steering wheel such that the first and second edges 34A and 34B come into close contact with one another with gap 44 therebetween when fully stitched together.

The thermally conductive polymer 42 may be applied onto the heater mat 34 and/or fabric backer 36 prior to assembly onto the steering wheel 20 to conduct thermal energy to the unheated portion proximate the stitch seam 24, according to one embodiment. It should be appreciated that other unheated portions of the steering wheel 20 may employ the thermally conductive polymer 42. For example, a rectangular portion extending over the center may better thermally conduct heat around the surface of the steering wheel 20. Further, the thermally conductive polymer 42 may be applied below other unheated regions such as the tuck portions 26.

The thermally conductive polymer 42 may be applied as a liquid polymer having thermally conductive properties. One example of a thermally conductive polymer 42 may include polyacetylene which may be available for application in a liquid form. The liquid conductive polymer may be applied by spraying or brushing onto the heater mat 34 and/or the optional fabric backer 36 and may be cured to a solid state by using heat and/or UV radiation curing. This may be achieved prior to assembly of the heater mat 34 onto the steering wheel 20 or after assembly of the heater mat 34 onto the steering wheel 20.

According to another example, the thermally conductive polymer 42 may be provided in the form of a solid such as conductive tape that may be adhered onto the heater mat 34 and/or fabric backer 36. Examples of thermally conductive polymer tape include polyacetylene in a solid form with a backing material and adhesive on at least one side.

The thermally conductive polymer 42 has thermal conductivity properties that allow for thermal energy to easily be transferred through the thermally conductive polymer 42. The thermally conductive polymer 42 polymer may include compounds that transfer electrons from one material to another to make a continuous thermal path. The electrical properties can be tuned using a process of organic synthesis or by using dispersion techniques/doping.

The heater mat 42 may include a single layer heater mat with electrically conductive heating material such as copper wire sewn into or printed on the compliant layer 32, according to one embodiment. The heater mat 42 may include multiple layers forming the heater mat, according another embodiment. In a multiple layer heater mat, the electrically conductive heating material may be fabricated on one side or between multiple layers.

Accordingly, the vehicle steering wheel 20 advantageously employs a thermally conductive polymer 42 to thermally conduct and thereby transfer thermal energy to unheated portions of the steering wheel 20 such as to regions under the stitch seam 24. This allows for the steering wheel 20 be heated more uniformly at a more uniform temperature which may be desirable to the driver of the vehicle operating the steering wheel 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle steering wheel comprising:
   a core structure;
   a heater surrounding at least a portion of the core structure to define a heated portion;
   a gap in the heater defining an unheated portion;
   a cover wrap surrounding the heater and having first and second edges joined together at a seam above the gap; and
   a thermally conductive polymer thermally coupled to the heater and extending across the gap below the first and second edges of the cover wrap for conducting thermal energy across the gap, wherein the gap extends below the first and second edges of the cover wrap and the conductive polymer extends over the gap, and wherein the thermally conductive polymer comprises a thermally conductive polymer tape.

2. The vehicle steering wheel of claim 1, wherein the first and second edges are stitched together at a stitch seam.

3. The vehicle steering wheel of claim 1, wherein the cover wrap comprises one of leather and vinyl.

4. The vehicle steering wheel of claim 1, wherein the thermally conductive polymer comprises a liquid curable polymer applied onto at least the first and second edges of the heater.

5. The vehicle steering wheel of claim 4, wherein the thermally conductive polymer comprises polyacetylene.

6. The vehicle steering wheel of claim 1, wherein the heater comprises an electric heater mat.

7. The vehicle steering wheel of claim 6, wherein the heater mat has first and second edges, wherein the gap is defined between the first and second edges of the heater mat.

8. The vehicle steering wheel of claim 1, wherein the core structure comprises a rigid core and a surrounding compliant layer.

9. The vehicle steering wheel of claim 1, wherein the cover wrap comprises a first cover wrap material overlapping at a tuck with a second cover wrap material, and wherein the conductive polymer further extends under the overlapping portions of the tuck.

10. A vehicle steering wheel comprising:
    a core structure;
    an electric heater mat surrounding a portion of the core structure to define a heated portion;
    a gap in the electric heater mat defining an unheated portion;
    a cover wrap surrounding the electric heater mat and having first and second edges stitched together at a seam; and
    a thermally conductive polymer thermally coupled to the electric heater mat and extending across the gap below the first and second edges of the cover wrap for conducting thermal energy, wherein the thermally conductive polymer comprises a thermally conductive polymer tape.

11. The vehicle steering wheel of claim 10, wherein the cover wrap comprises one of leather and vinyl.

12. The vehicle steering wheel of claim 10, wherein the gap extends below the first and second edges of the electric heater mat and the conductive polymer extends over or through the gap.

13. The vehicle steering wheel of claim 10, wherein the thermally conductive polymer comprises a liquid curable polymer applied onto at least the first and second edges of the electric heater mat.

14. The vehicle steering wheel of claim 13, wherein the thermally conductive polymer comprises polyacetylene.

15. The vehicle steering wheel of claim 10, wherein the core structure comprises a rigid core and a surrounding polyurethane layer.

16. The vehicle steering wheel of claim 10, wherein the cover wrap comprises a first cover wrap material overlapping at a tuck with a second cover material, and wherein the conductive polymer further extends under the overlapping portions.

17. The vehicle steering wheel of claim 10, wherein the heater mat has first and second edges, wherein the gap is defined between the first and second edges of the heater mat.

* * * * *